United States Patent [19]
Takaki

[11] Patent Number: 6,029,069
[45] Date of Patent: Feb. 22, 2000

[54] NAVIGATION SYSTEM USING PORTABLE PHONE AND NAVIGATION METHOD USING THE SAME

[75] Inventor: Tetsuya Takaki, Tokyo, Japan

[73] Assignee: NEC Corporation, Japan

[21] Appl. No.: 08/864,670

[22] Filed: May 28, 1997

[30] Foreign Application Priority Data

May 28, 1996 [JP] Japan ................................. 8-133975

[51] Int. Cl.[7] .................................................. H04Q 7/00
[52] U.S. Cl. ........................ 455/456; 455/414; 455/457
[58] Field of Search .................................. 455/412, 414, 455/456, 457; 342/357, 450, 457

[56] References Cited

U.S. PATENT DOCUMENTS

| | | | |
|---|---|---|---|
| 5,182,555 | 1/1993 | Sumner | 340/905 |
| 5,187,810 | 2/1993 | Yoneyama et al. | 455/457 |
| 5,398,189 | 3/1995 | Inoue et al. | 340/990 |
| 5,504,482 | 4/1996 | Schreder | 340/995 |
| 5,548,822 | 8/1996 | Yogo | 455/457 |
| 5,809,447 | 9/1998 | Kato et al. | 701/211 |

FOREIGN PATENT DOCUMENTS

| | | |
|---|---|---|
| 6-261149 | 9/1994 | Japan . |
| 6-350733 | 12/1994 | Japan . |
| 7-129894 | 5/1995 | Japan . |

OTHER PUBLICATIONS

Nikkei Electronics, Mar. 25, 1996, No. 658, p. 9, NEC.

*Primary Examiner*—Edward F. Urban
*Assistant Examiner*—Thuan T. Nguyen
*Attorney, Agent, or Firm*—Ostrolenk, Faber, Gerb & Soffen, LLP

[57] ABSTRACT

A name and a location of a building within a control area are correlated with a registered phone number. A map covering the control area and its periphery is stored based on the building. The destination building is searched based on the destination and navigation request. A plurality of voice direction messages are stored for directing the navigation. A plurality of question messages are stored for demanding the user to respond according to a predetermined format so as to specify the present location. When the navigation route extends over a plurality of control areas each controlled by a different base station, such information containing the destination, navigation request, present location and route is shared by those different base stations.

14 Claims, 6 Drawing Sheets

---

| SPECIFYING YOUR PRESENT LOCATION. |
|---|
| SELECT THE ITEM YOU ARE LOCATING.<br>(1)△△ STATION   (2)•••   (3) ~ |
| SELECT THE ITEM YOU CAN SEE IN FRONT OF YOU<br>(1)•••HOSPITAL  (2)○○BANK  (3) ~ |
| CAN YOU SEE B BUILDING ON YOUR LEFT?<br>(1)Yes     (2)No |
| SELECT THE ITEM YOU CAN SEE ON YOUR RIGHT.<br>(1)LIBRARY    (2) • • • • |
| SELECT THE ITEM YOU CAN SEE ON YOUR LEFT.<br>(1) POST OFFICE   (2) ~   (3) ••• |
| SELECT THE ENTRANCE    YOU ARE LOCATING.<br>(1)EAST-SIDE   (2)WEST-SIDE   (3)NORTH-SIDE |
| •<br>•<br>• |
| PLEASE WAIT UNTIL THE LOCATION IS SPECIFIED. |

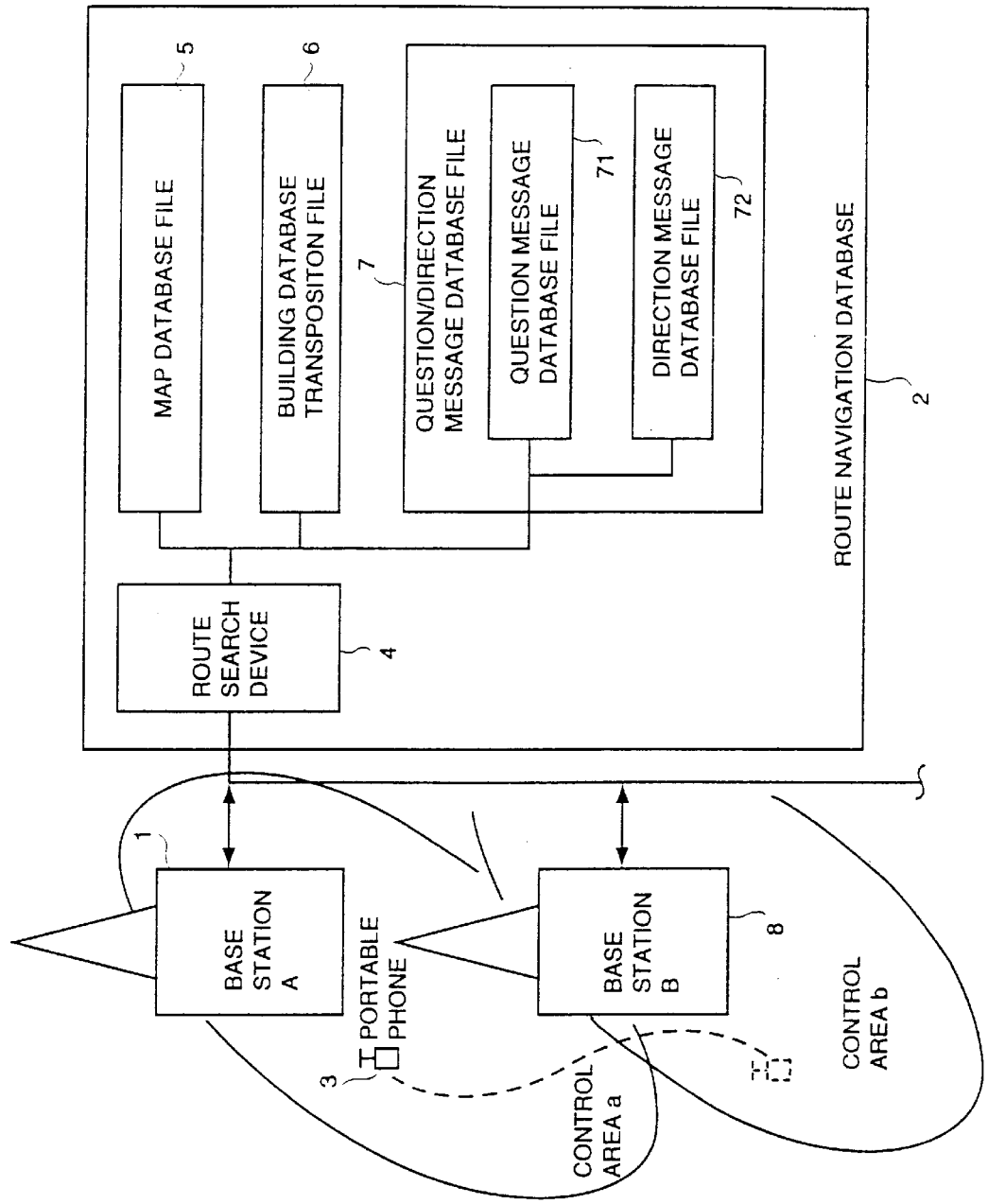

FIG.2

| NAME OF BUILDING | REGISTERED PHONE NO. | LAT./LONG. INFORMATION |
|---|---|---|
| A COMPANY HEAD OFFICE BUILDING | 0123-45-6789 | LAT.○○°N AND LON.○○°E |
| ○○BRANCH OF DEPARTMENT STORE | 1234-56-7890 | LAT.○×°N AND LON.○×°E |
| PUBLIC LIBRARY | 0001-23-4567 | LAT.×○°N AND LON.×○°E |
| HOSPITAL AFFILIATED WITH ××UNIVERSITY | ××××-○○-□□□□ | LAT.××°N AND LON.××°E |
| △△STATION | ○×○○-××-○××○ | LAT.○△°N AND LON.○△°E |
| FAST FOOD SHOP BRANCH | ×○×○-○○-××○○ | LAT.···°N AND LON.···E |
| RESTAURANT BRANCH | ×××○-××-×××○ | LAT.×××°N AND LON.×××°E |
| ⋮ | ⋮ | ⋮ |
| ○○BANK | 9876-54-3210 | LAT.○○○°N AND LON.○○○°E |
| ××POST OFFICE | 8765-43-2109 | LAT.○×○°N AND LON.×○×°E |

FIG.3

| SPECIFYING YOUR PRESENT LOCATION. |
|---|
| SELECT THE ITEM YOU ARE LOCATING.<br>(1)△△ STATION   (2)•••   (3)~ |
| SELECT THE ITEM YOU CAN SEE IN FRONT OF YOU<br>(1)•••HOSPITAL  (2)○○BANK  (3)~ |
| CAN YOU SEE B BUILDING ON YOUR LEFT?<br>(1)Yes   (2)No |
| SELECT THE ITEM YOU CAN SEE ON YOUR RIGHT.<br>(1)LIBRARY   (2)•••• |
| SELECT THE ITEM YOU CAN SEE ON YOUR LEFT.<br>(1) POST OFFICE   (2)~   (3)••• |
| SELECT THE ENTRANCE YOU ARE LOCATING.<br>(1)EAST-SIDE   (2)WEST-SIDE   (3)NORTH-SIDE |
| ⋮ |
| PLEASE WAIT UNTIL THE LOCATION IS SPECIFIED. |

FIG.4

| GO STRAIGHT. | GO STRAIGHT UNTIL THE NEXT SIGNAL. | GO STRAIGHT ALONG THE STREET. |
|---|---|---|
| TURN TO THE RIGHT. | TURN RIGHT AT THE NEXT SIGNAL. | TURN RIGHT ALONG THE STREET. |
| TURN TO THE LEFT. | TURN LEFT AT THE NEXT SIGNAL. | TURN LEFT ALONG THE STREET. |
| PLEASE ~. | GO STRAIGHT ON THIS CROSSING. | THEN GO STRAIGHT. |
| PLEASE ○○. | TURN RIGHT AT THIS CROSSING. | THEN TURN TO THE RIGHT. |
|  | TURN LEFT AT THIS CROSSING. | THEN TURN TO THE LEFT. |
| ⋮ | ⋮ | ⋮ |
| REACHING THE DESTINATION. | THANK YOU FOR USING OUR SERVICES. | THANK YOU FOR USING OUR SERVICES. |

NAVIGATION SYSTEM USING PORTABLE PHONE AND NAVIGATION METHOD USING THE SAME

BACKGROUND OF THE INVENTION

The present invention relates to a handy voice navigation system using a portable phone such as a cellular phone (hereinafter referred to as PDC) or a personal handy phone system (hereinafter referred to as PHS) that navigates a user of the portable phone to the desired destination upon receiving the voice band guidance from a base station that has received the information containing the present location and the desired destination reported by the user. More specifically the present invention relates to the voice navigation system of a portable phone that allows for an interactive process to specify the present location and the desired destination of the user and to navigate the user to the destination through synthetic voice.

The PHS service starting from July 1995 has urged the market to widely expand together with the conventional PDC services, expecting further increase in the number of users. The portable phone is expected to be used not only as a telephone but also as various kinds of applications.

Popularizing digitized interactive communication on the phone has enabled the phone itself to be integrated and formed into a logical circuit. Accordingly the digital portable phone is more suitable to transmit data compared with the portable phone of analogue type. The technology for connecting the digital portable phone to the information equipment such as a PC or a facsimile for transmitting either text data or image data has been widely spread.

In a first prior art disclosed in JP-A350733/1994, a portable phone is provided with a section for displaying map information.

When the user requires navigation to the base station controlling the service area where the user currently exists through the portable phone, the base station sends the user the map information covering the present service area and its periphery as the aid of navigation.

FIG. 6 is a view showing a construction of JP-A-261149/1994 as a second prior art. The second prior art of FIG. 6 forms a navigation system using a telephone network in which a navigation center is provided with a phone book database 103 correlated to a subscriber's phone number through a mobile communication channel 101 and a conventional public channel 102 for storing the subscriber's name, address and access point to the nearest traffic facilities.

When each user designates the subscriber's phone number as the destination to require navigation to the center 104 through the respective phone 101a–101c, 102a–102c, the center searches the phone book database 103 based on the phone numbers of both the user and the destination and supplies the user with the route leading to the destination, traffic information and the like.

FIG. 7 is a view explaining a construction of JP-A-A129894/1995 as a third prior art.

The third prior art of FIG. 7 comprises sensors Sa to Sn for detecting any damage of a vehicle and an on-board navigation system 201. The navigation system 201 comprises a built-in map database 202 that stores location data of a plurality of service centers. When the vehicle damage is detected, a route to the nearest service center is displayed on an image display device 204. Then navigation starts with the aid of the marking on the display and voice of a vocal guide device 200.

A cellular phone 203 can be connected to the navigation system 201 for communication with a control center supervising each service center through a telephone channel.

The control center stores a map database covering a wide area where a large number of service centers over a larger area have been registered. The voice data is further stored for aiding the voice guidance supplied by the navigation system 201.

The control center serves to support the navigation system 201 by indicating damage diagnosis, providing map information of the map database 202 or voice guidance of the voice guide device 200 even when no appropriate service center is located in the area that can be displayed by the navigation system 201.

Voice navigation using a conventional navigation system of the portable phone, however, has the following problems.

The first prior art requires the user to search the present location on the map by himself/herself. This also requires a display section on the portable phone for displaying the prepared map information. Such display section should have sufficient size and high resolution in order to allow the user to identify the present location with a single glance. Providing the aforementioned display section may increase the total weight and manufacturing cost, thus deteriorating handiness of the phone as well as failing to keep a reasonable price.

In the second prior art, the user's present location is reported to the base station as zone information of its control area. Therefore the base station cannot identify the present location as a specified spot. The navigation leading to the destination supplied by the base station becomes too rough for the user to be guided to the destination.

The third prior art has an assumption that, for example, a portable phone is combined with the on-board navigation system by which the user's present location is specified in advance. Therefore using only the portable phone cannot specify the present location, failing to have a report required for receiving the navigation service.

A navigation service using a Global Positioning System (GPS) has been well known as providing latitude and longitude of the present location on a global scale by calculating the time taken from reception of a wave signal sent from a plurality of geostationary satellites to reach thereof. The GPS used in an urban area with buildings standing close together is required to comprise a high sensitive antenna and a reception device, a logical circuit for calculating latitude and longitude based on the measured time or a built-in memory for storing map information covering a wide area. Providing the above-described components to the portable phone is not practical considering its excellent portability resulting from compact and lightweight characteristics.

SUMMARY OF THE INVENTION

It is an objective of the present invention to solve the aforementioned problems.

It is an objective of the present invention to provide a voice navigation system of a portable phone that allows for an interactive processing to specify the present location and the desired destination of the user and navigate the user to the destination with the synthetic voice with the aid of the voice guidance of a base station that has received the information containing the present location and destination reported from the user.

The above objective is realized by a navigation system using a portable phone comprising a portable phone for transmitting destination information on a destination building, a navigation request for navigation to the destination building and present location information on a present location of a user; a base station for controlling a call of said portable phone in its control area; a building database file for storing information on each name and location of buildings existing in the control area; a map database file for storing a map covering the control area and a map covering a periphery of the control area based on a building location; route search means for searching information on the destination building from the building database file based on a navigation request and destination information received through the base station and searching a navigation route starting from a present location to a destination from the map database file based on present location information received through the base station and the searched destination building information; and means for transmitting the searched navigation route information to the portable phone through the base station.

In the above navigation system, the name and location of a building within the control area are correlated with a telephone number of the phone set in the building, respectively and the map containing the control area and its periphery is stored based on the building. The destination building is detected based on the destination and navigation request. The navigation route is searched based on the location information and the destination.

BRIEF DESCRIPTION OF THE DRAWINGS

This and other objectives, features and advantages of the present invention will become more apparent upon a reading of the following detailed description and drawings, in which:

FIG. 1 is a view explaining a construction of an embodiment of the present invention;

FIG. 2 is a view explaining data contained in a building database transposition file of FIG. 1;

FIG. 3 is a view explaining data contained in a question message database file of FIG. 1;

FIG. 4 is a view explaining data contained in a direction message database file of FIG. 1;

DESCRIPTION OF PREFERRED EMBODIMENTS

Figure 5:
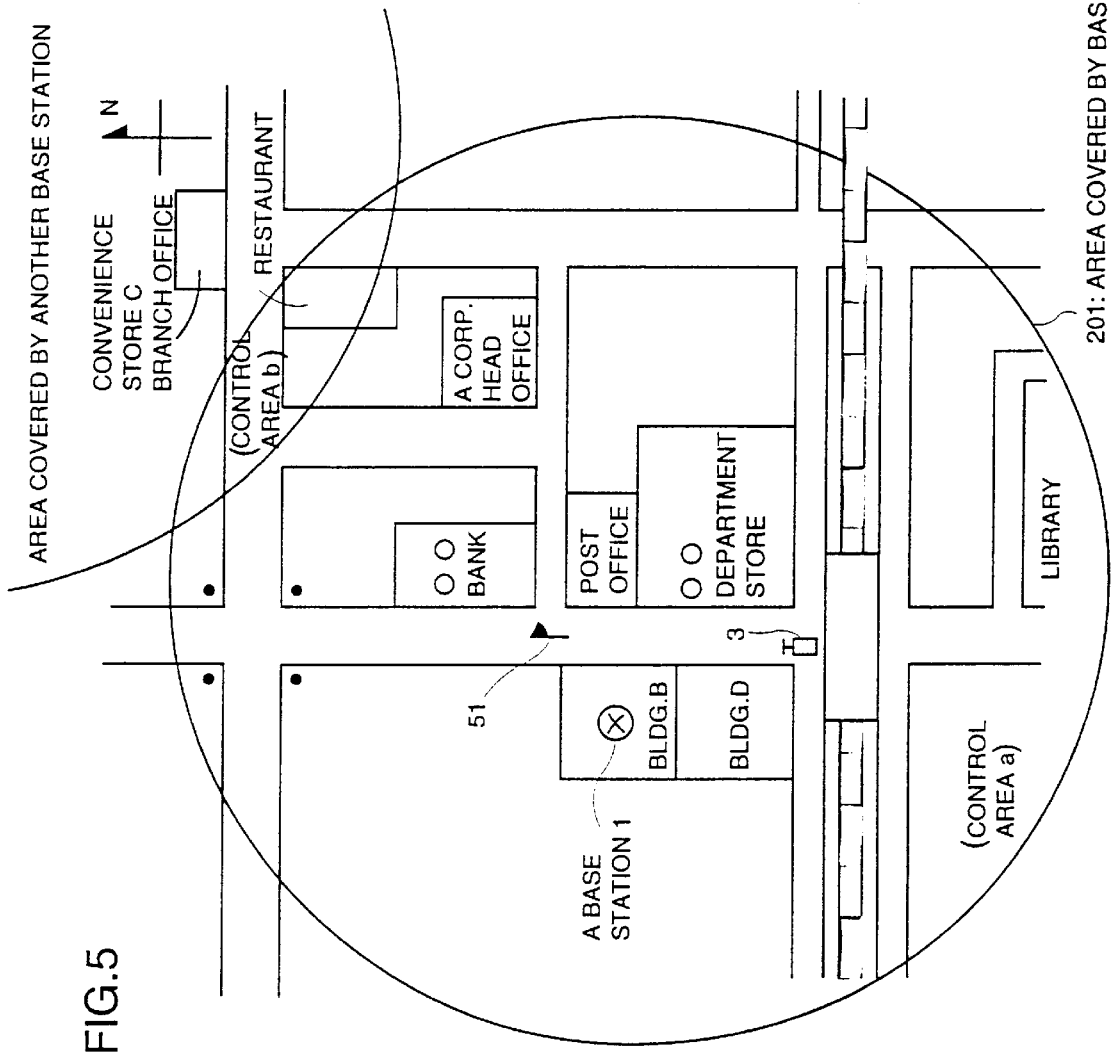
FIG. 5 is a view explaining an example of navigation of an embodiment of FIG. 1.
Figure 6:
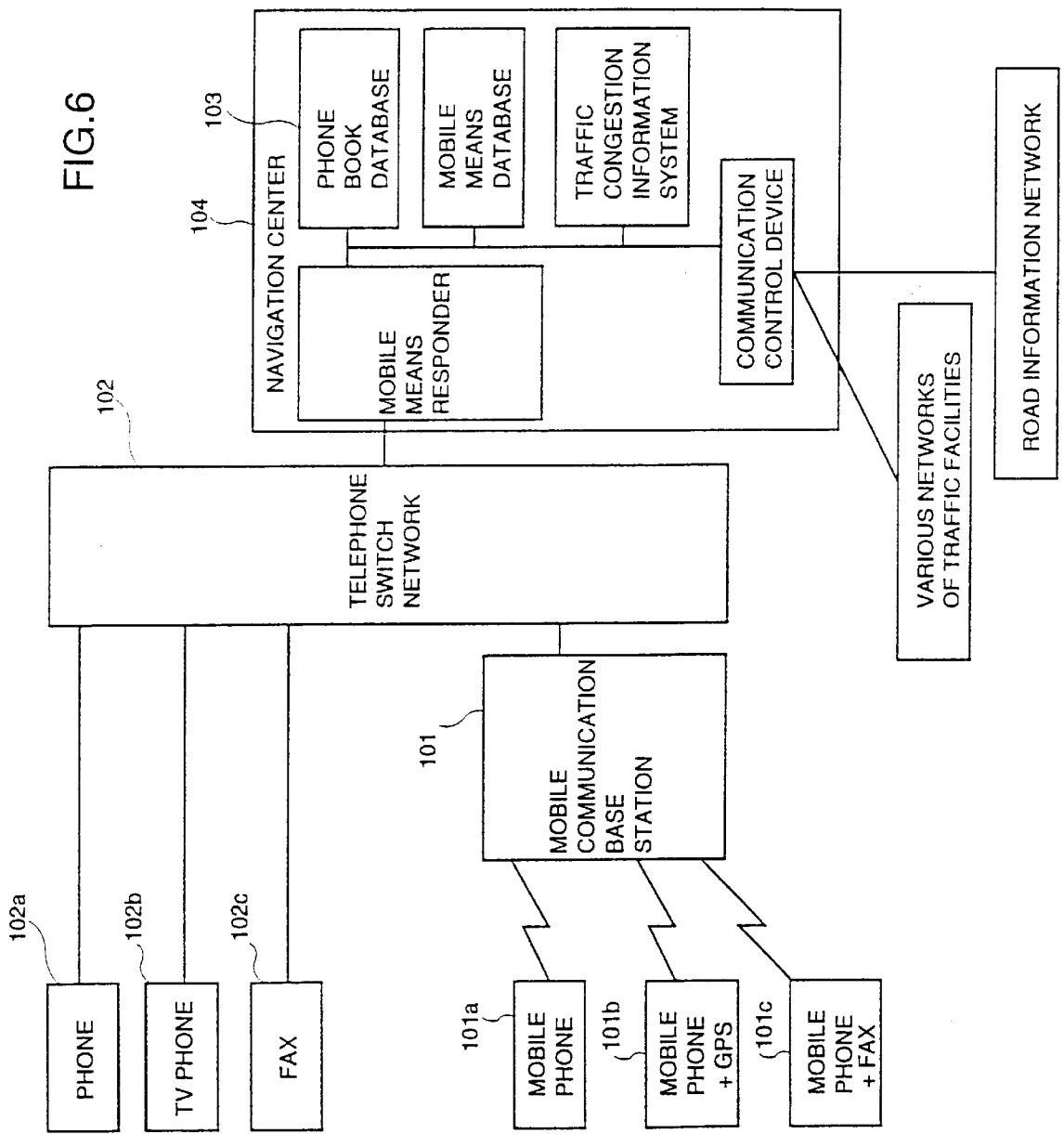
FIG. 6 is a construction of a second prior art.
Figure 7:
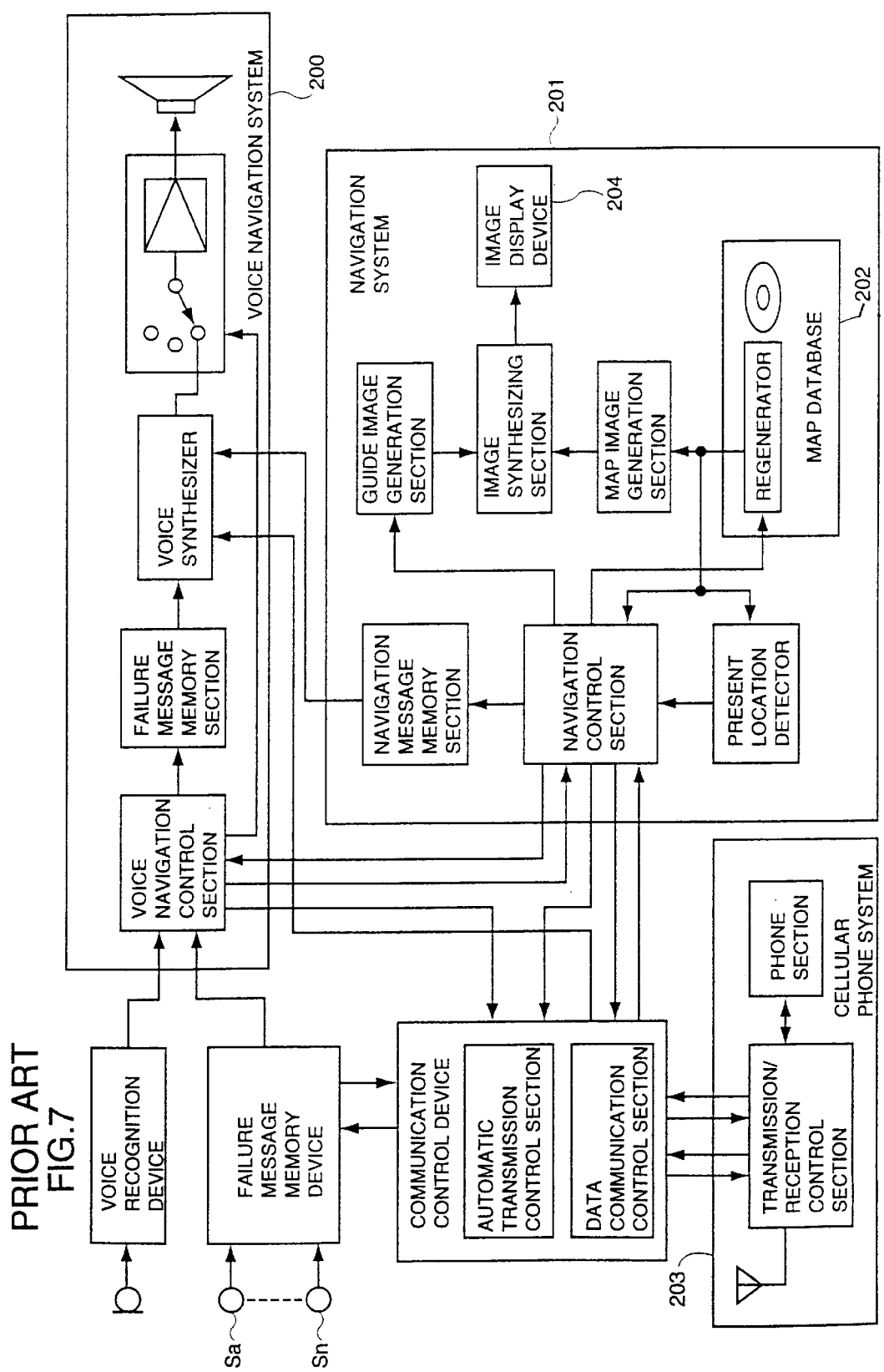
FIG. 7 is a construction of a third prior art.

Embodiments of the present invention are described referring to the drawings.

FIG. 1 shows a construction of the embodiment of the present invention.

This embodiment of FIG. 1 comprises an A base station 1 and a route navigation database 2 connected thereto through a telephone network for navigating along the desired route.

The A base station 1 covers a control area a comprising a plurality of zones to control phone calls between the portable phones 3..3 therein.

A control area b adjacent to the control area a is covered by a B base station 8 that is different from the A base station and connected to the route navigation database 2 through the telephone network in the same manner as other base stations covering the respective control areas.

The route navigation database 2 comprises a route search device 4 connected to the telephone network for detecting the desired route; a map database file 5 for storing map information, a building database transposition file 6 for storing building information to search the map database file 5 and question/direction message database file 7 for storing question and direction messages when providing the route navigation.

The map database file 5, the building database transposition file 6 and the question/direction message database file 7 can be accessed from the route search device 4, respectively.

Upon receiving the navigation request from the user of the respective portable phones 3..3, the route navigation database 2 starts providing voice navigation to the corresponding portable phone 3..3.

The load exerted to the intermediate process of the A base station 1 can be reduced by providing the route navigation database 2 with the route search device 4. Each database file can be directly searched responding to the instruction of the A base station 1 so that the route search device 4 is designed to control the database search only.

The map database file 5 stores maps of the control areas a, b and others, which can be searched based on the location information indicating the building location.

The building database transposition file 6 stores names and location information of buildings existing within the respective control areas a, b and the like each correlated with the respective registered phone number of the phone set within the destination building. The location information is expressed as the latitude and longitude of the location of the building on the map.

The navigation is requested by providing the location information containing a destination relating to a certain building, navigation request to the building and location information of the user's present location.

The route search device 4 detects the corresponding building based on the destination and the navigation request by searching the building database transposition file 6 so that the navigation route within the map database file can be searched based on the location information and the destination.

A routeway is formed by dividing the route into a plurality of zones to define a boundary between two divided zones as a question point. It is confirmed whether the user reaches the respective question points so as to make sure that the user can always follow the proposed route. Direction points more than the question points are defined by the respective boundaries among a plurality of other divided zones.

The user is expected to be directed to move from one direction point to the next. Therefore the routeway can be formed by correlating direction messages and question messages at the respective points to the user's possible response. The direction point can be overlapped with the question point.

The question/direction message database file 7 comprises a question message database file 71 for storing a plurality of question messages and a direction message database file 72 for storing a plurality of direction messages.

The question message stands for the voice message to demand the user to respond to the question according to a predetermined format for specifying the user's present location. The direction message stands for the voice message to navigate the user to the destination in an order based on the route information.

FIG. 2 is a table showing data stored in the building database transposition file of FIG. 1.

The building database transposition file shown in FIG. 2 contains a building name column of the building name identical to the one appeared on the map of the map data base file 5, a registered phone number column for searching the map database file 5 to specify the building and a latitude/longitude information column for searching the map database file 5 to specify the building.

The building name column can be designed to accommodate the nickname and abbreviation of the building name. Alternatively the building name column can be searched based on the key words.

The registered phone number can be obtained by searching the map database file 5 using either a long-distance number or a local phone number.

In the latitude/longitude information column, for example, the location information is stored in the form of, for example, lat. ○○° ○○'○○"N and long.○○° ○○'○○"E, correlated with the map information. The address information indicating the relevant point of the map database file 5 is available for the normal file access.

FIG. 3 shows a group of messages stored in the question message database file of FIG. 1.

The question message database file 71 shown in FIG. 3 comprises question messages for notifying the user of the start or end of the question, stand-by period for searching or judgment or starting over to specify the present location owing to an error and selective question messages to demand the user to select a right answer for specifying the building.

The selective question messages have two types; demanding the user to select a right building among a plurality of buildings and to select Yes or No with respect to confirmation of the building.

A simple code such as a number, mark, alphabet or Kana character is put to each selective item to simplify the user's response. Alternatively the selective item can be identified with a known voice identification technique.

FIG. 4 shows a group of messages stored in the direction message database file of FIG. 1.

The direction message database file 72 shown in FIG. 4 contains direction messages to notify the user of start or end of the direction and stand-by period for searching and messages to demand the user to have a certain action, moving, confirming the direction or operating the portable phone.

The message of the latter type has been in the simple form by combining the distance of straight movement and right/left turning directions, so that the user can understand the message upon hearing it.

The function of the embodiment of the present invention is described.

When the user carrying a portable phone 3 requires navigation, the request is connected to a route navigation database 2 through the A base station 1 covering the control area a. The registered phone number of the destination required by the user is designated.

In the route navigation database 2, the route search device 4 searches the building database transposition file 6 based on the registered phone number to provide the corresponding location information.

The route search device 4 searches the question message database file 71 and transmits the question message to the user in a predetermined order. Responding to the answer of the user either through the voice or a DTMF signal to the question, the route search device 4 judges whether or not the user's present location can be specified.

When the present location can be specified, the specified data are held as the present location. When it cannot be specified, the question message database file 71 is further searched to transmit different questions to the user sequentially. The present location is determined after a series of processings of question and judgment.

The route search device 4 searches the map database file 5 based on the present location and the registered phone number. The most appropriate route is obtained from the location information of the relevant map taking the present location as a starting point and the registered phone number as the destination.

The routeway is formed by setting the direction points and question points along the navigation route.

The route search device 4 transmits the direction message at the respective direction points sequentially conforming to the routeway. While at the question point, the transmission of question and judgment of the response are repeated to confirm whether the user is following the determined route by verifying the location information at each point from the present location to the destination.

The time taken from transmitting the question to receiving the response is measured. When the time exceeds the predetermined value, the error correction is expected to be executed, for example, the user's present location is specified again.

FIG. 5 shows an example of the navigation of an embodiment of FIG. 1.

FIG. 5 shows the data contained in the map information of the map database file 5. In this case, the user carrying the portable phone 3 stands in front of ΔΔstation and requires navigation to the headquarters building of the company A.

The route starting from ΔΔstation to the headquarters building of the company A exists within the control area a of the A base station 1, which is adjacent to the control area b of the B base station 8 covering C branch of convenience store.

This user designates the destination by transmitting the registered phone number of the headquarters building of the company A, i.e., 0123-45-6789, to the A base station 1. The A base station 1 transmits the registered phone number to the route navigation database 2, directing to start navigation in response to the user's request.

Receiving the direction of the A base station 1, the route search device 4 searches the building database transposition file 6 based on the registered phone number to obtain the location information of the headquarters building of A company from the latitude/longitude information column. Then the name of the headquarters building of A company is obtained from the building name column for confirming the destination building and then transmitted to the A base station 1.

Upon receiving direction of the A base station 1, the route search device 4 searches the question message database file 71 for obtaining question messages in a predetermined order for transmission to the A base station 1.

For example, the user is supposed to select a correct answer with respect to the question, i.e., "Select the place you are locating." from "·ΔΔstation, ·○○bank, · in front of ..building". Then the user responds by answering the right code or pushing the button of the right number.

Then a series of further question messages are transmitted to specify the present location based on the user's response. For example, the user is supposed to select a correct answer with respect to the question, "Select entrance of ΔΔstation you are locating." from "·Eastside, ·Westside, ·Northside or the like". Then the user responds by answering the right code.

As the present location of the user can be narrowed down to the Northside Entrance of ΔΔstation allowing for searching the map database file 5, the routeway is formed by taking the specified present location and the destination as the location information. According to the routeway, the user is expected to go straight. When walking past the building B to the left, the user turns to the right at a T-junction looking Post Office to the right and then goes straight. The suitable route can be formed by combining the respective route element as described above.

The navigation point 51 that demands the user to change movement is added as the direction point as well as the starting point and the end point of the route. Then the relevant direction messages are obtained by searching the direction message database file 72 in advance.

The navigation point 51 and the end point can be set as the question point so that the relevant question messages are obtained by searching the question messages database file 71 in advance. The possible responses to the respective questions can be added.

The aforementioned process is merely a preparation stage for navigation. As the routeway for the user is completed, the A base station 1 starts navigation.

First the A base station 1 transmits the direction message "Go straight until you reach the building B. Then press the button No. 1 in front of the building B." to the user.

When the user responds by pressing the button No. 1, the message "Turn to the left." as the next prepared direction is transmitted. The message "Go straight until you reach Post Office and press the button No. 1 when reaching there." is further transmitted. A plurality of direction messages are transmitted sequentially so that the user follows the route leading to the headquarters of the company A.

In case the user's destination is changed to the branch C of convenience store covered by the B base station 8 where the navigation route in the control area a extends over the control area b, information such as the destination, navigation request, present location and route can be shared by the B base station through the route navigation database 2.

Therefore the respective information can be efficiently stored when providing the navigation service on the route extending over a plurality of control areas.

An another embodiment of the present invention is described referring to FIG. 5.

In this embodiment, the user is supposed to report information on the peripheral condition of the present location before requesting navigation through a portable phone 1. Upon receiving the report, the A base station 1 specifies the user's present location.

More specifically, the user transmits the message indicating the peripheral condition of the user such as "Currently standing at Northside Entrance of ΔΔstation" to the A base station 1 through voice or a DTMF signal conforming to a predetermined code table. Then the user requests navigation.

The A base station 1 specifies the present location of the user either through a known voice recognition technology to recognize the voice or the code table to decode the present location.

When the registered phone number of the destination is transmitted from the user, the navigation starts in the same way as described in the former embodiment.

It is understood that the present invention is not limited to the foregoing embodiments and that various changes and modifications may be made in the invention without departing from the spirit and scope thereof.

The following effects are provided by the present invention.

First, the user carrying the portable phone is expected to respond to the transmission of the question or direction messages concerning the user's present location by selecting and pushing the button of the appropriate number or speaking the answer. As the present location is specified using voice band through voice or DTMF signal, the navigation system can be realized by a construction similar to a conventional portable phone at a reasonable cost.

Second, a plurality of direction points and question points are set along the route to form the routeway. Each direction is transmitted sequentially at the respective points and the user's response is confirmed by each cycle of question and response. Therefore the present invention makes sure to allow the user to follow the navigation route easily in spite of the unfamiliar and complicated route.

The present invention provides a voice navigation system using the portable phone that allows for an interactive processing to specify the user's present location and the desired destination and navigate the user to the destination with the synthetic voice with the aid of the voice guidance of a base station that has received the information containing the present location and destination reported by the user.

The entire disclosure of Japanese Patent Application No. 8-133975 filed on May 28, 1996 including specification, claims, drawing and summary are incorporated herein by reference in its entirety.

What is claimed is:

1. A navigation system using a portable phone comprising:

a portable phone for transmitting destination information for a destination building, a navigation request for navigation to said destination building and present location information on a present location of a user of said portable phone;

a base station for controlling a call of said portable phone in its control area;

a building database file for storing information of each name and location of buildings existing in said control area;

a map database file for storing a map covering said control area and a map covering a periphery of said control area based on a building location;

a question message database file for storing question messages which demand said portable phone user to input a response according to a predetermined format to determine a present location of said portable phone user;

route search means for retrieving information for said destination building from said building database file based on a navigation request and destination information received through said base station, and searching said map database file for a navigation route starting from a present location to a destination based on present location information received through said base station and said retrieved destination building information, and for searching said question message database file for a question message used to determine the present location of said portable phone user; and means for transmitting said question message and said navigation route to said portable phone through said base station.

2. The navigation system using a portable phone of claim 1, comprising a direction message database file for storing a plurality of voice direction messages for directing navigation, wherein said route search means further comprises means for searching said direction message database file for a direction message which uses a building as a navigation point along with a navigation route and directing a navigation route based on a searched direction message.

3. The navigation system using a portable phone of claim 1 comprising a plurality of base stations connected to said route search means, wherein information containing destination, navigation request, present location and navigation route is shared by said plurality of base stations when a navigation route extends over control areas of different base stations.

4. The navigation system using a portable phone of claim 1, wherein said building database file stores information of each name and location for buildings existing in a control area correlated with a registered phone number of a phone set in said building, said route search means comprises means for receiving a registered phone number of a phone set in a destination building as said destination information and retrieving a name and location of said destination building from said building database file based on said registered phone number.

5. A voice navigation system using a portable phone comprising:

a portable phone for transmitting a registered phone number of a phone set in a destination building, a navigation request for navigation to said destination building and present location information for a present location of a user;

a base station for controlling a call of said portable phone in its control area;

a building database file for storing information of each name and location of buildings existing in said control area correlated with a registered phone number of a phone set in said building;

a map database file for storing a map covering said control area and a map covering a periphery of said control area based on a building location;

a direction message database file for storing a plurality of voice direction messages for directing navigation;

a question message database file for storing question messages which demand said user to input a response according to a predetermined format in order to determine said user's present location;

means for receiving a navigation request from said portable phone through said base station and a registered phone number of a phone set in said destination building and retrieving information for a name and location of said destination building from said building database file based on said registered phone number;

means for searching said question message database file to retrieve a question message used to determine a present location of said portable phone user and transmitting said question to said portable phone through said base station;

means for determining said user's present location from said map database file based on a response to said question;

means for searching said map database file to determine a navigation route starting from a present location to a destination based on said user's present location and said destination building location; and means for searching said direction message database file for a direction message using a building as a navigation point along with said navigation route and transmitting said direction message to said portable phone through said base station.

6. The navigation system using a portable phone of claim 5 comprising a plurality of base stations, wherein information containing destination, navigation request, present location and navigation route is shared by said plurality of base stations when a navigation route extends over control areas of different base stations.

7. A navigation system using a portable phone that obtains information on a destination building, a navigation request for navigation to said building and location information of a Portable phone user's present location from a base station controlling calls among a plurality of portable phones in its control area for navigating said portable phone comprising:

a building database file for storing information of each name and location of buildings existing in said control area;

a map database file for storing a map covering said control area and a map covering a periphery of said control area based on a building location; and a question message database file for storing question messages which demand said portable phone user to input a response according to a predetermined format to determine a present location of said portable phone user; and a route search device for searching a building database transposition file to determine a building corresponding to a destination and a navigation request and determining a navigation route based on location information and said destination within said map database file, and for searching said question message database file for a question message used to determine the present location of said portable phone user.

8. The navigation system using a portable phone of claim 7, further comprising a direction message database file for storing a plurality of voice direction messages for directing navigation, wherein said route search means searches said direction message database file for a direction message which uses a building as a navigation point along with a navigation route and directs a navigation route based on said direction message.

9. The navigation system using a portable phone of claim 7 comprising a plurality of base stations connected to said route search means, wherein information containing destination, navigation request, present location and navigation route is shared by said plurality of base stations when said navigation route extends over control areas of different base stations.

10. The navigation system using a portable phone of claim 7, wherein said building database file stores information of each name and location for buildings existing in a control area correlated with a registered phone number of a phone set in said building, said route search means comprises means for receiving a registered phone number of a phone set in a destination building as said destination information and retrieving a name and location of said destination building from said building database file based on said registered phone number.

11. A navigation method using a portable phone comprising the steps of:

transmitting destination information of a destination building, a navigation request for navigation to said building and a user's present location information to a base station by said user through a portable phone thereof, said base station controls an area used by said user;

searching location information for said destination building from a building database file based on said transmitted destination information, said building database file storing each name and location for buildings existing in said control area;

searching a map database file for a navigation route starting from a present location to a destination, said map database file storing a map covering said control area and a map covering a periphery of said control area based on a building location by referring to said transmitted present location information and said destination building location information;

preparing a question message database file for storing question messages that demand said user to input a response according to a predetermined format in order to specify a present location, retrieving a question message used to specify a present location of said user from said question message database file; and navigating said user by transmitting said retrieved question message to said portable phone to determine a present location of said user, and transmitting said navigation route information to said portable phone.

12. The navigation method using a portable phone of claim 11, wherein a direction message database file storing a plurality of voice direction messages for directing navigation is prepared, a direction message database is searched for a direction message for directing a building as a navigation point based on a navigation route, and a navigation route is provided through voice direction.

13. The navigation method using a portable phone of claim 11, wherein said building database file stores information of each name and location for buildings existing in said control area correlated with a registered phone number of a phone set in said building, a registered phone number of a phone set in a destination building is transmitted as said destination information so that a name and location of said destination building is retrieved from said building database file based on said registered phone number.

14. The navigation method using a portable phone of claim 11, wherein information containing destination, navigation request, present location and navigation route is shared by said plurality of base stations when said navigation route extends over control areas of different base stations.

* * * * *